United States Patent
Wu

(10) Patent No.: US 10,797,886 B2
(45) Date of Patent: Oct. 6, 2020

(54) BLOCKCHAIN CONSENSUS METHOD AND DEVICE

(71) Applicant: Alibaba Group Holding Limited, George Town (KY)

(72) Inventor: Hao Wu, Chengdu (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/585,407

(22) Filed: Sep. 27, 2019

(65) Prior Publication Data

US 2020/0028692 A1    Jan. 23, 2020

Related U.S. Application Data

(63) Continuation of application No. PCT/CN2018/080439, filed on Mar. 26, 2018.

(30) Foreign Application Priority Data

Mar. 28, 2017   (CN) .......................... 2017 1 0191996

(51) Int. Cl.
   *H04L 9/32* (2006.01)
   *H04L 9/06* (2006.01)
   *H04L 9/30* (2006.01)

(52) U.S. Cl.
   CPC .......... *H04L 9/3247* (2013.01); *H04L 9/0637* (2013.01); *H04L 9/30* (2013.01)

(58) Field of Classification Search
   CPC ..................... H04B 17/309; H04B 17/318; H04B 7/18519; Y02P 80/114; Y02P 90/02;
   (Continued)

(56) References Cited

U.S. PATENT DOCUMENTS

| | | | |
|---|---|---|---|
| 8,702,875 B2* | 4/2014 | Kim | .......................... C21D 6/00 148/320 |
| 9,529,923 B1 | 12/2016 | Baird, III | |
| 2004/0128378 A1* | 7/2004 | Blakley, III | ............ G06F 21/41 709/224 |
| 2016/0142511 A1* | 5/2016 | Smith | ..................... H04L 67/02 709/223 |
| 2016/0330031 A1 | 11/2016 | Drego et al. | |
| 2016/0342977 A1 | 11/2016 | Lam | |

(Continued)

FOREIGN PATENT DOCUMENTS

| | | |
|---|---|---|
| CN | 102999529 | 3/2013 |
| CN | 105488675 | 4/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

Primary Examiner — Abiy Getachew
(74) Attorney, Agent, or Firm — Fish & Richardson P.C.

(57) ABSTRACT

This specification describes techniques for performing blockchain consensus. An example method performed by a first node in a blockchain includes: receiving first service data; determining a corresponding handling time of the first service data; storing the first service data including the corresponding handling time at a cache, in which the cache stores multiple pieces of additional service data, and in which each piece of additional service data is associated with a respective handling time; determining whether a consensus needs to be performed on at least two pieces of service data; in response to determining that the consensus needs to be performed, selecting the at least two pieces of service data according to a sequence that is based on handling times associated with the at least two pieces of service data; and performing the consensus on the more than one pieces of service data according to the sequence.

21 Claims, 2 Drawing Sheets

(58) Field of Classification Search
CPC ... Y02P 90/86; G06T 19/006; G06T 2210/04; G06T 7/00; G06T 11/60; G16H 10/60; G16H 50/20; G16H 10/20; G16H 40/20; G16H 80/00; G16H 15/00; G16H 40/63; H04N 2005/91342; H04N 5/913; H04N 21/2541; H04N 21/25435; H04N 21/812; Y04S 10/54; G01C 15/00; G01C 21/206; G01C 21/34; G01C 21/343; G01C 21/3691; G01M 5/00; G01M 5/0066; H04L 2209/38; H04L 9/3236; H04L 2209/56; H04L 9/3247; H04L 63/061; H04L 63/0876; H04L 9/3066; H04L 9/3239; H04L 9/3297; H04L 63/0428; H04L 63/0435; H04L 63/0442; H04L 63/06; H04L 63/08; H04L 63/0823; H04L 63/083; H04L 63/0861; H04L 67/104; H04L 9/006; H04L 9/0637; H04L 9/085; H04L 9/0891; H04L 9/0894; H04L 9/321; H04L 9/3226; H04L 9/3252; H04L 9/3255; H04L 9/3263; H04L 9/3268; H04L 9/3271; H04L 9/34; G06F 21/31; G06F 21/54; G06F 21/57; G06F 21/602; G06F 21/6227; G06F 21/6272; G06F 21/64; G06F 21/645; G06Q 20/3825; G06Q 2220/00; G06Q 20/06; G06Q 20/065; G06Q 20/223; G06Q 20/3678; G06Q 20/3823; G06Q 20/3829; G06Q 20/401; H04W 12/1006

See application file for complete search history.

(56) References Cited

U.S. PATENT DOCUMENTS

| | | |
|---|---|---|
| 2017/0083860 A1 | 3/2017 | Sriram et al. |
| 2018/0285412 A1* | 10/2018 | Zhuang ............... G06F 16/2379 |
| 2019/0289031 A1 | 9/2019 | Kozloski et al. |
| 2019/0312875 A1* | 10/2019 | Sardesai ............... H04L 9/3297 |
| 2019/0332586 A1* | 10/2019 | Wang ................... G06Q 40/02 |
| 2020/0145228 A1 | 5/2020 | Wu |

FOREIGN PATENT DOCUMENTS

| | | |
|---|---|---|
| CN | 105790954 | 7/2016 |
| CN | 106534273 | 3/2017 |
| CN | 106534317 | 3/2017 |
| CN | 107450979 | 12/2017 |
| TW | 201627889 | 8/2016 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/080439, dated Jun. 29, 2018, 13 pages (with English translation).

Extended European Search Report in European Application No. 18774835.5, dated Nov. 11, 2019, 9 pages.

PCT International Preliminary Report on Patentability in International Application No. PCT/CN2018/080439, dated Oct. 1, 2019, 9 pages (with English translation).

\* cited by examiner

US 10,797,886 B2

BLOCKCHAIN CONSENSUS METHOD AND DEVICE

CROSS-REFERENCE TO RELATED APPLICATIONS

This application is a continuation of PCT Application No. PCT/CN2018/080439, filed on Mar. 26, 2018, which claims priority to Chinese Patent Application No. 201710191996.2, filed on Mar. 28, 2017, and each application is hereby incorporated by reference in its entirety.

TECHNICAL FIELD

The present application relates to the field of information technologies, and in particular, to a blockchain consensus method and device.

BACKGROUND

With the development of information technologies, people focus on the blockchain technology because of advantages such as openness, tamper-resistance, and decentralization of the blockchain technology. Because the existing blockchain technology is characterized by decentralization, before a service executed in the blockchain is stored in the blockchain (i.e., a chaining operation is performed to record data in the blockchain), each node in the blockchain needs to perform consensus on service data (e.g., a result obtained after processing is performed on the service) corresponding to the service.

Usually, a block capacity (e.g., a pre-determined capacity) is limited in a blockchain, but sometimes space occupied by service data waiting for consensus in a node may be greater than the block capacity. Therefore, in the existing technology, a node that initiates consensus further needs to select some service data from stored service data, to perform consensus on the selected service data.

The node usually selects, based on a value (e.g., a transaction amount) corresponding to data (e.g., transaction data) of a certain attribute in the service data, the service data on which consensus is to be performed.

Each node in the blockchain determines, based on values (e.g., a transaction amount) corresponding to specified attributes of pieces of service data stored in the node in descending order, a list of the pieces of service data on which consensus is to be performed. Each node in the blockchain can select, based on a sequence of the pieces of service data that are stored in the node and that are in the list of the pieces of service data on which consensus is to be performed, service data as the service data on which consensus needs to be performed, to complete consensus performed on the selected service data.

However, the previous method has the following disadvantages: Because services on which consensus is to be performed in the list of the services data on which consensus is to be performed are arranged based on a value corresponding to a specified attribute in service data, service data with a smaller value waits for consensus for a relatively long time. Consequently, relatively low processing efficiency of the service data is caused.

SUMMARY

Implementations of the present application provide a blockchain consensus method, to alleviate a problem that processing efficiency of some service data is relatively low because the service data waits for consensus for a relatively long time in an existing blockchain consensus method.

Implementations of the present application provide a blockchain consensus apparatus, to alleviate a problem that processing efficiency of some service data is relatively low because the service data waits for consensus for a relatively long time in an existing blockchain consensus method.

An implementation of the present application provides a blockchain consensus method, including: receiving, by a node in a blockchain, service data, and determining a handling time of the service data; storing, by the node, the service data that includes the handling time; and when consensus needs to be performed on service data, selecting, by the node based on the handling time, the service data on which consensus is to be performed, and performing consensus on the selected service data on which consensus is to be performed.

An implementation of the present application provides a blockchain consensus apparatus, including: a determining module, configured to receive service data, and determine a handling time of the service data; a storage module, configured to store the service data that includes the handling time; a selection module, configured to select, based on the handling time when consensus needs to be performed on service data, the service data on which consensus is to be performed; and a consensus module, configured to perform consensus on the selected service data on which consensus is to be performed.

At least one of the previously described technical solutions used in the implementations of the present application can achieve the following beneficial effects:

When receiving service data, a node in a blockchain determines a handling time of the service data, and stores the service data that includes the handling time, so that when consensus needs to be performed on service data, the node can select, based on the handling time, the service data on which consensus is to be performed, and perform consensus on the selected service data. It can be seen that, according to the method provided in the present application, service data on which consensus is to be performed is no longer selected based on a value corresponding to a certain attribute in the service data, but selected based on a handling time of handling the service data by a node that handles the service data. As such, a time for service data to wait for consensus is effectively ensured to be relatively balanced, a problem in the existing technology that some service data waits for consensus for a relatively long time can be alleviated, processing efficiency of service data is effectively improved, and operational performance of the blockchain is improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

Figure 1:
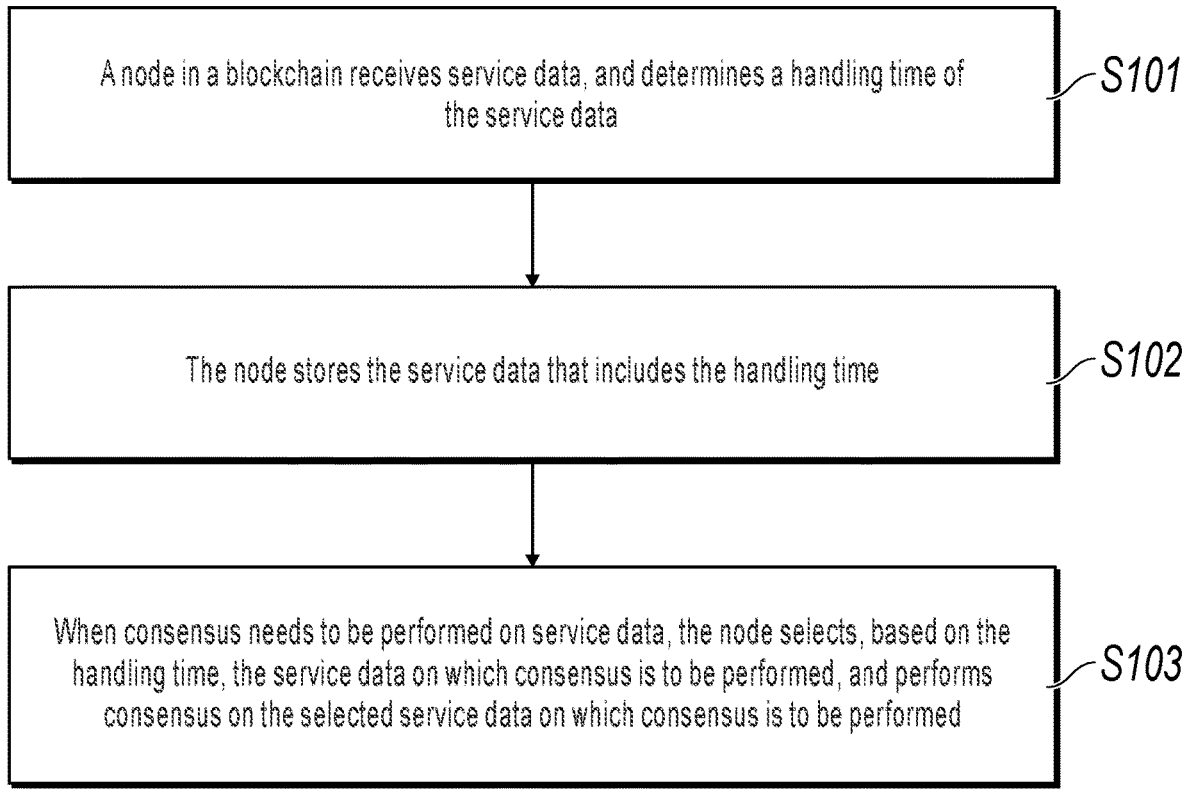
FIG. 1 illustrates a blockchain consensus process, according to an implementation of the present application.

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

In the existing blockchain technology, data in a blockchain is jointly maintained by blockchain nodes (which referred to as nodes for short below) in a blockchain network. When receiving a service request, a node usually stores service data corresponding to the service request in a block through three steps: cache, consensus, and storage, and a chaining operation is performed on the block to store the service data in the blockchain corresponding to the node. When most nodes in the blockchain network store the service data in blockchain data of the respective nodes, the service data can be considered as to be stored in the blockchain data jointly maintained by the nodes.

Consensus is a necessary step, and consensus mechanisms such as a proof-of-work (PoW) mechanism, a practical Byzantine fault tolerance (PBFT) mechanism, and a proof-of-stake mechanism are used currently. The proof-of-work mechanism is used as an example here for description.

A node can first receive a service request sent by a user, where the service request includes service data, and the service request can be directly entered by the user into the node, and the node can also receive a service request broadcast by another node in the blockchain network. How the node receives the service request does not affect service execution.

Afterwards, the node can determine the corresponding service data based on the service request. A process in which the node determines the corresponding service data based on the service request can be referred to as a process in which the node handles the service request, and a method for determining the service data may vary with a specific case. For example, service data included in a common service request includes content that needs to be executed in a service. For example, for a transaction service request, the transaction service request includes information such as a payer address, a payer balance, a payment amount, and a payee address, and a node that receives the service request can directly determine service data based on the service request. For another example, the common service request can further include service data such as an instruction for a smart contract. As such, when handling the service request, the node may further need to perform service processing based on different service data in the service request, and obtain a result of service processing. Therefore, when determining the service data, the result of service processing can also be used as the service data. The node can also use both the service data included in the service request and the result of service processing as the service data corresponding to the service request. Content included in the service data may vary with a configuration of the blockchain provided that the data corresponds to the service request and needs to be stored in the blockchain data. As such, the data can be considered as the service data.

It is worthwhile to note that nodes in the blockchain network can be divided into a handling node and a non-handling node for a service request. The handling node is a node that receives the service request sent by a user or another device. The non-handling node is a node that obtains the service request from another node in a broadcast way.

When the determined service data is not stored in the blockchain data on which consensus is performed, the service data is service data on which consensus is to be performed, and can be stored in a cache of the node.

Then, after determining the service data on which consensus is to be performed, the node can broadcast the service data on which consensus is to be performed to another node in the blockchain network, that is, synchronize the service data on which consensus is to be performed to other nodes in the blockchain network. As such, the nodes in the blockchain network can receive the service data on which consensus is to be performed and that is sent in a broadcast way. When consensus is performed subsequently, the nodes in the blockchain network can perform consensus on the service data on which consensus is to be performed.

Finally, the nodes in the blockchain network can determine, based on the consensus mechanism of the blockchain, the node that initiates the consensus, and the node that initiates the consensus selects service data on which consensus is to be performed from service data on which consensus is to be performed and that is stored in the node. Then, the nodes in the blockchain network can perform, based on the consensus mechanism of the blockchain, consensus on the service data on which consensus is to be performed and that is selected by the node that initiates the consensus.

When performing consensus on service data on which consensus is to be performed and that is sent by the node that initiates the consensus, each node in the blockchain network can determine whether the received service data on which consensus is to be performed is stored in a list of pieces of service data on which consensus is to be performed and that are in a cache of the node. In response to determining that the received service data on which consensus is to be performed is stored in the list of pieces of service data on which consensus is to be performed and that are in the cache of the node, it can be determined that consensus on received services on which consensus is to be performed succeeds, and a new block that records the service data on which consensus is to be performed is stored in blockchain data maintained by the node. Otherwise, the new block is not stored.

The technical solutions provided in the implementations of the present application are described in detail below with reference to the accompanying drawings.

FIG. 1 illustrates a blockchain consensus process, according to an implementation of the present application, and the process can include the following steps.

S101: A node in a blockchain receives service data, and determines a handling time of the service data.

In a blockchain network, there are usually two types of nodes: a service node and a consensus node. The service node is usually configured to initiate a service request, and is not a necessary node. Whether the service node stores complete blockchain data can be determined based on a construction status of the blockchain network. There may be no service node in some blockchain networks. The consensus node is a necessary node in the blockchain network, and is configured to receive a service request, and initiate consensus or receive a consensus proposal sent by another consensus node, based on a consensus mechanism of the blockchain. Service data on which consensus is performed is stored in a block of the blockchain. The node described in the present implementation of the present application can be considered as a consensus node in the blockchain network, and the node can receive a service request, and determine received service data based on the service request.

The node can be a terminal device, for example, a device such as a mobile phone, a personal computer, or a tablet computer. Alternatively, the node can be a server, and the server can be a separate device, or can be a system including a plurality of devices, provided that the device can receive a service request and initiate consensus as a node of the blockchain network. Implementations are not limited in the present application.

In addition, in the existing technology, a service request in a blockchain usually includes but is not limited to service data shown in Table 1.

TABLE 1

| Service attribute | Content |
|---|---|
| Service identifier | Unique identifier in a blockchain |
| Version | Version identifier of a service generation mechanism |
| Public key | Public key of a service initiator |
| Signature | Service digest obtained after the service initiator performs signature by using a private key corresponding to the public key |
| Service information | Specific content of a service |
| Block identifier corresponding to a service | Hash value of a corresponding block in which service data is stored after a chaining operation is performed |

Table 1 shows service attributes and corresponding content that may be included in the service data in the service request, that is, the service data further includes other content. Implementations are not limited here. The version attribute is used as an example for description. Content corresponding to the version attribute can be included in the service request (i.e., written by client software or a node that sends the service request), or can be determined by a node in a subsequent process of performing service processing on the service request, and added to the version attribute corresponding to the service data. For another example, content corresponding to the block identifier corresponding to the service can be a determined hash value of a new block when the node determines that the service data corresponding to the service request can be stored in the new block of the blockchain. When the node receives the service request, content of the attribute can be empty, and specific content can wait for the node to write.

In addition, the service identifier can be a digest of the service content, or can be a globally unique identifier determined by the service initiator in the blockchain, or can be an identifier of the service data that is determined by the node when the node handles the service request. The service identifier can be determined by using a method in the existing technology. Implementations are not limited in the present application, provided that the service data can be uniquely determined in the blockchain data.

Further, in the present implementation of the present application, after receiving the service request, the node can determine the service data corresponding to the service request (i.e., handle the service request) based on the service request, so that when subsequently selecting service data on which consensus is to be performed for consensus, it can be determined whether to store the service data in a new block of the blockchain data as the service data on which consensus is to be performed (i.e., whether to perform a chaining operation).

Furthermore, when consensus is subsequently performed on the service data, a problem that selecting the service data for consensus by the node that initiates the consensus is affected due to a quantity of resources of some attributes in the service data can be alleviated. In the present implementation of the present application, when handling the service request (e.g., determining service data on which consensus is to be performed and that corresponds to the service request), the node can determine a local timestamp of the node, and use the local timestamp as the handling time of the service data on which consensus is to be performed.

For a service request, there is usually only one node that handles the service request. Therefore, the handling time, that is determined by the node when handling the service request, of the corresponding service data on which consensus is to be performed is also unique in the blockchain data. In addition, the handling time does not vary with content of the service data corresponding to the service request. In addition, because the handling time is determined when the node handles the service request, another node that receives, in a broadcast way, the service data on which consensus is to be performed does not determine different selection results due to different times of receiving the service data on which consensus is to be performed during consensus. Therefore, a handling timestamp of the service data on which consensus is to be performed is less affected (e.g., service content and a network delay).

In the present implementation of the present application, the node can also use, as the handling time of the service data corresponding to the service request, a timestamp corresponding to a local time of the node when the node receives the service request. Alternatively, the node can also determine the timestamp of the service data in another way (e.g., when receiving the service data, the node performs processing on the service data to obtain a processing result, and determine a generation time of the processing result as the handling time of the service data), provided that the timestamp of the service data is determined by the node that receives the service request, that is, the timestamp of the service data in the blockchain data can be determined by only one node.

In addition, as described above, for different blockchains or different service requests, because the service data corresponding to the service request may further include data such as an operation instruction for a smart contract, the node may further need to perform service processing based on the service data to obtain a service processing result. Therefore, the handling time of the service can be further a local timestamp of the node when the node obtains the service processing result after performing service processing based on the service request (or the service data in the service request).

Further, if precision of the handling time determined by the node is relatively low, for example, a time precision level of a second, when the node handles a plurality of service requests within one second, service data corresponding to each of the plurality of service requests that are handled within one second has the same handling time. As a result, it may be difficult to subsequently select the service data on which consensus is to be performed. Therefore, to reduce a probability that a plurality of pieces of service data have the same handling time, in the present implementation of the present application, the handling time can be provided with higher precision, for example, the handling time is determined in millisecond precision. Specifically, the handling time can be set by personnel based on actual application needs. For example, each node in the blockchain network receives a service request on average every minute. Therefore, time precision of the handling time can be set to be relatively low.

S102. The node stores the service data that includes the handling time.

In the present implementation of the present application, after determining the handling time of the service data, the node can store the service data that includes the handling time, for example, store the service data that includes the handling time in a local cache of the node, so that when consensus needs to be performed subsequently, consensus can be performed on the service data.

The node can add, to the service data, the handling time of the service data that is determined in step S101. If there is already a timestamp attribute in attributes of the service data, and content of the timestamp attribute is empty, the determined handling time of the service data is written into the timestamp attribute. If data has been written into the original timestamp attribute of the service data, or there is no timestamp attribute in the service data, the node can add a new "handling time" attribute for the service data, and the handling time of the service data that is determined in step S101 is written into the "handling time" attribute.

That is, in the present implementation of the present application, when the node adds the handling timestamp to the service data, the node can add a handling time attribute for the service data, and use a value of the handling time of the service data as content of the handling time attribute, so that the service data includes the handling time. For example, the service data shown in Table 1 is used as an example. The node can update the service data to service data shown in Table 2.

TABLE 2

| Service attribute | Content |
| --- | --- |
| Service identifier | Unique identifier in a blockchain |
| Version | Version identifier of a service generation mechanism |
| Public key | Public key of a service initiator |
| Signature | Service digest obtained after the service initiator performs signature by using a private key corresponding to the public key |
| Service information | Specific content of a service |
| Block identifier corresponding to a service | Hash value of a corresponding block in which service data is stored after a chaining operation is performed |
| Handling time | Timestamp corresponding to a local time of a service handling party (i.e., a node that handles a service request) when the service handling party determines the service data |

As described in step S101 in the present implementation of the present application, the handling time can also be a time of determining the service processing result after the node performs service processing. Therefore, before performing step S102 in the present application, the node can further perform a service processing operation based on an actual application status by using the service request and/or the service data. Because service processing can be performed by using a method for processing a service by a node in the existing blockchain technology, details are omitted in the present application.

Further, the node can further store, in the cache of the node, the service data that includes the handling time, to wait for consensus.

Specifically, when storing the service data that includes the handling time, the node can store the service data that includes the handling time in a pool of service data on which consensus is to be performed in the cache of the node, or store the service data that includes the handling time in a form of a list in the cache of the node. A method for storing the service data that includes the handling time is not limited in the present application.

S103: When consensus needs to be performed on service data, the node selects, based on the handling time, the service data on which consensus is to be performed, and performs consensus on the selected service data on which consensus is to be performed.

In the present implementation of the present application, once it is determined that consensus needs to be performed on the service data, regardless of a consensus mechanism, nodes in the blockchain uniformly select, based on the handling time of the service data, the service data on which consensus is to be performed. As such, it can be ensured that the same service data is used when consensus is performed.

It is worthwhile to note that the handling time described in the present implementation of the present application can be understood as a timestamp. The timestamp can be a timestamp generated by the node for the service request when the node handles the service request, or can be a timestamp generated after the node processes a received service request. Implementations are not limited here.

The node can select, based on a time sequence of handling times of stored pieces of service data, the service data on which consensus is to be performed for consensus.

Specifically, the cache of the node can store a plurality of pieces of service data, including the service data determined by the node by receiving the service request, and service data (i.e., a service on which consensus is to be performed that is determined by another node) that is synchronized to the node by another node in the blockchain network and that is received by the node in a broadcast way. A handling time of service data determined by the node is determined by the node, and a handling time of service data determined by another node is not determined by the node, but is determined by another node that handles a service request corresponding to the service data.

Because pieces of service data stored in the node all include a corresponding handling time, and the service data usually has a different handling time, in the present implementation of the present application, the node can first sort the pieces of service data based on a time sequence of handling times of the pieces of the service data.

Then, the node can determine a block capacity of a new block based on a consensus mechanism of the blockchain, and further determine, based on the block capacity, an amount of service data that can be recorded in the new block. To reduce storage space occupied by data recorded in the blockchain data, before the service data is recorded in the block, a digest of the service data is first calculated, and the digest of the service data is recorded in the block. Therefore, when determining the amount of service data, the node can determine, based on occupation space of the digest of the service data and the block capacity, the amount of service data that can be recorded. A method for determining the amount of service data that can be recorded by the node is not limited in the present application, and can be determined based on actual application needs by configuring a consensus mechanism.

Further, the node can select, based on an amount of service data that is determined for consensus and a sequence of pieces of sorted service data, the amount of service data as the service data on which consensus is to be performed.

Because the same service data on which consensus is to be performed has the same timestamp in each node in the blockchain, pieces of service data on which consensus is to be performed and that are determined by different nodes in the blockchain network at the same time are arranged in the same sequence. Therefore, if different nodes in the blockchain network initiate consensus at the same time, a probability that different nodes select the same service data on which consensus is to be performed is relatively high.

For example, assume that for node A in the blockchain network, service data stored in a cache of node A is shown in Table 3.

TABLE 3

| Identifier of service data | Timestamp of a handling time |
|---|---|
| Service 1 | 100 |
| Service 2 | 99 |
| Service 3 | 102 |
| Service 4 | 70 |

Service 1 and service 3 are service data determined by node A by handling a service request, service 2 is service data sent by node B to node A, and service 4 is service data sent by node C to node A.

In this case, node A can sort pieces of service data based on a time sequence of handling times of the pieces of service data, and can determine a sorting list shown in Table 4.

TABLE 4

| Identifier of service data | Timestamp of a handling time |
|---|---|
| Service 4 | 70 |
| Service 2 | 99 |
| Service 1 | 100 |
| Service 3 | 102 |

Then, node A can determine, based on a consensus mechanism, a quantity of services on which consensus needs to be performed. Assume that the quantity of services on which consensus needs to be performed is 2, node A can select service 4 and service 2 as service data on which consensus is to be performed.

The node may also not to sort the pieces of stored service data based on a time sequence of the handling times, but traverses the handling times of the pieces of service data, and then select, based on the time sequence of the handling times, the service data on which consensus is to be performed. How the node selects, based on the time sequence of the handling times of the pieces of service data, the service data on which consensus is to be performed is not limited in the present application, provided that the node selects, based on the time sequence of the handling times of the pieces of service data, the service data on which consensus is to be performed, in other words, consensus is first performed on service data that is handled first.

According to the blockchain consensus process shown in FIG. 1, when receiving service data, a node in the blockchain network determines a handling time of the service data, and stores the service data that includes the handling time. When consensus needs to be performed on service data, a sequence of handling times of pieces of service data can be determined based on the handling times of the pieces of service data, and service data on which consensus is to be performed and that satisfies a block capacity of a block in which the service data is to be stored can be selected in sequence for consensus based on a principle of first handling first consensus. Therefore, even if the service data is sent by another node, because the handling time of the service data is a timestamp of handling the service data by a node that receives the service data, the same handling timestamp of the service data is recorded by nodes in the blockchain network. As such, consensus is first performed on a service request that is first handled in the blockchain network, a time for service data to wait for consensus is effectively ensured to be relatively balanced, a problem in the existing technology that some service data waits for consensus for a relatively long time can be alleviated in comparison with the existing technology, processing efficiency of service data is effectively improved, and operational performance of the blockchain is improved.

In addition, in step S102 of the present implementation of the present application, when storing the service data, the node can store the service data in the cache based on a time sequence and the handling time of the service data. In this case, a service data list can be configured in the cache of the node, and service data in the list is arranged based on a sequence of handling times. In step S103, when consensus needs to be performed on the service data, only a quantity of services on which consensus is to be performed needs to be determined, and the amount of service data is selected from the service data list in sequence, and is used as the service data on which consensus is to be performed.

Further, in the present implementation of the present application, when receiving service data broadcast by another node in the blockchain network, the node can first determine whether the service data already exists in service data stored in the node. In response to determining that the service data already exists in service data stored in the node, the service data is not stored in the node (i.e., two same services on which consensus is to be performed are avoided to be stored). Otherwise, the service data is stored in the local cache of the node.

Furthermore, if there is a service data list in which service data is arranged based on a time sequence in the node, when determining to store the service data, the node can add the received service data to the service data list of the node based on a time sequence and the handling time of the service data.

For example, assume that the service data list described in Table 4 is service data stored in node A. When service data received by node A and sent by node B is service 5, and a handling time of service 5 is 10, node A can insert service 5 into the service data list based on a time sequence of handling times, as shown in Table 5.

TABLE 5

| Identifier of service data | Timestamp of a handling time |
|---|---|
| Service 5 | 10 |
| Service 4 | 70 |
| Service 2 | 99 |
| Service 1 | 100 |
| Service 3 | 102 |

It is worthwhile to note that all steps of the method provided in the present implementation of the present application can be performed by the same device, or the method can be performed by different devices. For example, step S101 and step S102 can be performed by device 1, and step S103 can be performed by device 2. For another example, step S101 can be performed by device 1, and step S102 and step S103 can be performed by device 2.

Figure 2:
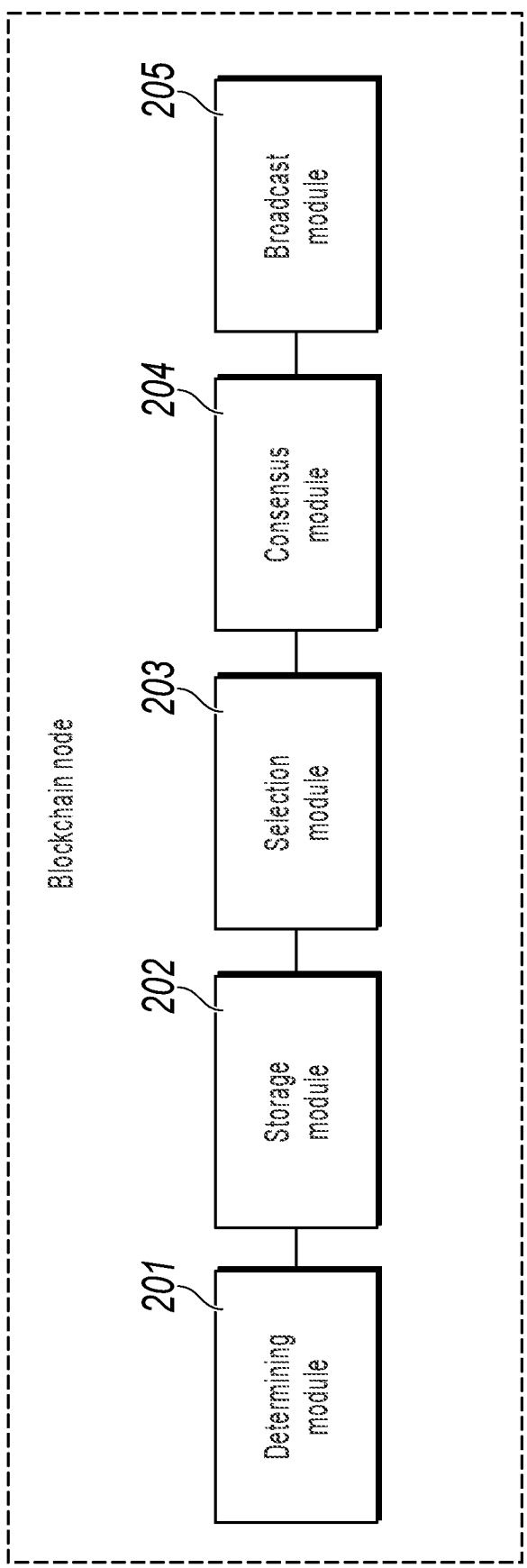
FIG. 2 is a schematic structural diagram illustrating a blockchain consensus apparatus, according to an implementation of the present application.

Based on the blockchain consensus method shown in FIG. 1, an implementation of the present application further correspondingly provides a schematic structural diagram of a blockchain consensus apparatus, as shown in FIG. 2.

FIG. 2 is a schematic structural diagram illustrating a blockchain consensus apparatus, according to an implementation of the present application, and the apparatus includes a determining module 201, configured to receive service data, and determine a handling time of the service data; a storage module 202, configured to store the service data that includes the handling time; a selection module 203, configured to select, based on the handling time when consensus needs to be performed on service data, the service data on which consensus is to be performed; and a consensus module 204, configured to perform consensus on the selected service data on which consensus is to be performed.

In another implementation of the present application, the determining module 201 is configured to determine a handling time of the service data, including: determining a time at which the service data is received, and determining the time as the handling time of the service data; or processing the service data at a time at which the service data is received, to obtain a processing result, and determining a generation time of the processing result as the handling time of the service data.

In another implementation of the present application, the apparatus further includes a broadcast module 205.

The broadcast module 205 is configured to broadcast the service data that includes the handling time to another node in the blockchain after the handling time of the service data is determined.

In another implementation of the present application, the determining module 201 is configured to receive service data and determine a handling time of the service data, including: receiving, in a broadcast way, service data sent by another node in the blockchain; and determining a handling time included in the service data as the handling time of the service data.

In another implementation of the present application, the selection module 203 is configured to select, based on the handling time, the service data on which consensus is to be performed, including: selecting, based on a time sequence of handling times, the service data on which consensus is to be performed and that satisfies a block capacity of a block in which the service data is to be stored.

As shown in FIG. 2, the blockchain consensus apparatus can be located in a server, and the server can be a separate device or a system including a plurality of devices. Alternatively, the consensus apparatus can also be located in a terminal device such as a mobile phone, a tablet computer, and a personal computer.

In the 1990s, whether technology improvement is hardware improvement (e.g., improvement of a circuit structure such as a diode, a transistor, or a switch) or software improvement (improvement of a method procedure) can be easily distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (e.g., a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, a Very-High-Speed Integrated Circuit Hardware Description Language (VHDL) and Verilog are most commonly used. A person skilled in the existing technology should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor, a processor, or a computer readable medium, a logic gate, a switch, an application-specific integrated circuit (ASIC), a programmable logic controller, or an embedded microcontroller that stores computer readable program code (e.g., software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the existing technology also knows that a controller can be implemented by using a pure computer readable program code method, and the method steps can be logically programmed to enable the controller to implement the same functions in forms of a logic gate, a switch, an application-specific integrated circuit, a programmable logic controller, an embedded microcontroller, etc. Therefore, the controller can be considered as a hardware component, and an apparatus included in the controller and configured to implement various functions in the controller can also be considered as a structure in a hardware component. Alternatively, an apparatus configured to implement various functions can be considered as a software module that can implement the method or a structure in a hardware component.

The system, apparatus, module, or unit illustrated in the previous implementations can be implemented by using a computer chip or an entity, or can be implemented by using a product that has a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is described by dividing the functions into various units. When the present application is implemented, the functions of the units can be implemented in one or more pieces of software and/or hardware.

A person skilled in the existing technology should understand that an implementation of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk memory, a compact disc read-only memory (CD-ROM), and an optical memory) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction device implements a specific function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device or any other non-transmission medium. The computer storage medium can be used to store information that can be accessed by a computing device. As described in the present specification, the computer readable medium does not include computer readable transitory media (transitory media) such as a modulated data signal and a carrier.

It is worthwhile to further note that the terms "include", "comprise", or their any other variants are intended to cover a non-exclusive inclusion, so that a process, a method, a product or a device that includes a list of elements not only includes those elements but also includes other elements which are not expressly listed, or further includes elements inherent to such a process, method, product, or device. An element preceded by "includes a . . . " does not, without more constraints, preclude the existence of additional identical elements in the process, method, article, or device that includes the element.

A person skilled in the existing technology should understand that an implementation of the present application can be provided as a method, a system, or a computer program product. Therefore, the present application can use a form of hardware only implementations, software only implementations, or implementations with a combination of software and hardware. In addition, the present application can use a form of a computer program product implemented on one or more computer-usable storage media (including but not limited to a magnetic disk memory, a compact disc read-only memory (CD-ROM), and an optical memory) that include computer-usable program code.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The implementations of the present specification are described in a progressive way. For same or similar parts in the implementations, references can be made to the implementations. Each implementation focuses on a difference from other implementations. Particularly, a system implementation is basically similar to the method implementation, and therefore is described briefly. For related parts, references can be made to partial descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a first node in a blockchain, a first blockchain transaction from a second node in the blockchain, wherein the second node sends a broadcast message to a plurality of nodes in the blockchain, wherein the broadcast message comprises the first blockchain transaction;
   determining, by the first node in the blockchain, a corresponding handling time of the first blockchain transaction based on a time at which the second node in the blockchain received the first blockchain transaction;
   storing, by the first node in the blockchain, the first blockchain transaction comprising the corresponding handling time at a cache, wherein the cache stores at least one additional blockchain transaction, and wherein each one of the at least one additional blockchain transaction is associated with a respective handling time;
   determining, by the first node in the blockchain, whether a consensus needs to be performed on at least two blockchain transactions in the cache, wherein the at least two blockchain transactions are associated with at least a first handling time and a second handling time, respectively, that are based on a time at which the second node receives the at least two blockchain transactions;
   in response to a determination that the consensus needs to be performed, selecting, by the first node in the blockchain, the at least two blockchain transactions on which the consensus is to be performed according to at least the first handling time and the second handling time associated with the at least two blockchain transactions; and
   performing, by the first node in the blockchain, the consensus on the at least two blockchain transactions according to at least the first handling time and the second handling time.

2. The computer-implemented method of claim 1, wherein determining the corresponding handling time of the first blockchain transaction comprises:
   determining a time at which the first blockchain transaction is received by the first node, and setting the time at which the first blockchain transaction is received by the first node as the handling time of the blockchain transaction; or
   processing the first blockchain transaction, to obtain a processing result, and setting a generation time of the processing result as the handling time of the blockchain transaction.

3. The computer-implemented method of claim 1, wherein, after determining the corresponding handling time of the first blockchain transaction, the method further comprises:
   broadcasting the first blockchain transaction and the corresponding handling time of the first blockchain transaction to another node in the blockchain.

4. The computer-implemented method of claim 1, wherein determining the corresponding handling time of the first blockchain transaction comprises determining a local timestamp corresponding to a local time at which the second node in the blockchain received the first blockchain transaction.

5. The computer-implemented method of claim 1, wherein selecting the at least two blockchain transactions on which the consensus is to be performed is further based on satisfying a block capacity of a blockchain block in which the first blockchain transaction is to be stored.

6. The computer-implemented method of claim 1, wherein determining the corresponding handling time of the first blockchain transaction comprises:
   processing the first blockchain transaction to obtain a processing result associated with a generation time; and
   setting the generation time as the corresponding handling time of the first blockchain transaction.

7. The computer-implemented method of claim 1, wherein the first blockchain transaction comprises at least one of a service attribute, a service identifier, a version identifier, a public key, a signature, a service information, and a block identifier.

8. A non-transitory, computer-readable medium storing one or more instructions executable by a computer system to perform operations comprising:
   receiving, by a first node in a blockchain, first blockchain transaction from a second node in the blockchain, wherein the second node sends a broadcast message to a plurality of nodes in the blockchain, wherein the broadcast message comprises the first blockchain transaction;
   determining, by the first node in the blockchain, a corresponding handling time of the first blockchain transaction based on a time at which the second node in the blockchain received the first blockchain transaction;
   storing, by the first node in the blockchain, the first blockchain transaction comprising the corresponding handling time at a cache, wherein the cache stores at least one additional blockchain transaction, and wherein each one of the at least one additional blockchain transaction is associated with a respective handling time;
   determining, by the first node in the blockchain, whether a consensus needs to be performed on at least two blockchain transactions in the cache, wherein the at least two blockchain transactions are associated with at least a first handling time and a second handling time, respectively, that are based on a time at which the second node receives the at least two blockchain transactions;
   in response to a determination that the consensus needs to be performed, selecting, by the first node in the blockchain, the at least two blockchain transactions on which the consensus is to be performed according to at least the first handling time and the second handling time associated with the at least two blockchain transactions; and performing, by the first node in the blockchain, the consensus on the at least two blockchain transactions according to at least the first handling time and the second handling time.

9. The non-transitory, computer-readable medium of claim 8, wherein determining the corresponding handling time of the first blockchain transaction comprises:
determining a time at which the first blockchain transaction is received by the first node, and setting the time at which the first blockchain transaction is received by the first node as the handling time of the blockchain transaction; or
processing the first blockchain transaction, to obtain a processing result, and setting a generation time of the processing result as the handling time of the blockchain transaction.

10. The non-transitory, computer-readable medium of claim 8, wherein the operations comprise:
after determining the corresponding handling time of the first blockchain transaction, broadcasting the first blockchain transaction and the corresponding handling time of the first blockchain transaction to another node in the blockchain.

11. The non-transitory, computer-readable medium of claim 8,
wherein determining the corresponding handling time of the first blockchain transaction comprises determining a local timestamp corresponding to a local time at which the second node in the blockchain received the first blockchain transaction.

12. The non-transitory, computer-readable medium of claim 8, wherein selecting the at least two blockchain transactions on which the consensus is to be performed is further based on satisfying a block capacity of a blockchain block in which the first blockchain transaction is to be stored.

13. The non-transitory, computer-readable medium of claim 8, wherein determining the corresponding handling time of the first blockchain transaction comprises:
processing the first blockchain transaction to obtain a processing result associated with a generation time; and
setting the generation time as the corresponding handling time of the first blockchain transaction.

14. The non-transitory, computer-readable medium of claim 8, wherein the first blockchain transaction comprises at least one of a service attribute, a service identifier, a version identifier, a public key, a signature, a service information, and a block identifier.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a first node in a blockchain, a first blockchain transaction from a second node in the blockchain, wherein the second node sends a broadcast message to a plurality of nodes in the blockchain, wherein the broadcast message comprises the first blockchain transaction;
determining, by the first node in the blockchain, a corresponding handling time of the first blockchain transaction based on a time at which the second node in the blockchain received the first blockchain transaction;

storing, by the first node in the blockchain, the first blockchain transaction comprising the corresponding handling time at a cache, wherein the cache stores at least one additional blockchain transaction, and wherein each one of the at least one additional blockchain transaction is associated with a respective handling time;
determining, by the first node in the blockchain, whether a consensus needs to be performed on at least two blockchain transactions in the cache, wherein the at least two blockchain transactions are associated with at least a first handling time and a second handling time, respectively, that are based on a time at which the second node receives the at least two blockchain transactions;
in response to a determination that the consensus needs to be performed, selecting, by the first node in the blockchain, the at least two blockchain transactions on which the consensus is to be performed according to at least the first handling time and the second handling time associated with the at least two blockchain transactions; and
performing, by the first node in the blockchain, the consensus on the at least two blockchain transactions according to at least the first handling time and the second handling time.

16. The computer-implemented system of claim 15, wherein determining the corresponding handling time of the first blockchain transaction comprises:
determining a time at which the first blockchain transaction is received by the first node, and setting the time at which the first blockchain transaction is received by the first node as the handling time of the blockchain transaction; or
processing the first blockchain transaction, to obtain a processing result, and setting a generation time of the processing result as the handling time of the blockchain transaction.

17. The computer-implemented system of claim 15, wherein the operations comprise:
after determining the corresponding handling time of the first blockchain transaction, broadcasting the first blockchain transaction and the corresponding handling time of the first blockchain transaction to another node in the blockchain.

18. The computer-implemented system of claim 15,
wherein determining the corresponding handling time of the first blockchain transaction comprises determining a local timestamp corresponding to a local time at which the second node in the blockchain received the first blockchain transaction.

19. The computer-implemented system of claim 15, wherein selecting the at least two blockchain transaction on which the consensus is to be performed is further based on satisfying a block capacity of a blockchain block in which the first blockchain transaction is to be stored.

20. The computer-implemented system of claim 15, wherein determining the corresponding handling time of the first blockchain transaction comprises:
processing the first blockchain transaction to obtain a processing result associated with a generation time; and
setting the generation time as the corresponding handling time of the first blockchain transaction.

21. The computer-implemented system of claim 15, wherein the first blockchain transaction comprises at least one of a service attribute, a service identifier, a version identifier, a public key, a signature, a service information, and a block identifier.

\* \* \* \* \*